United States Patent
Burgazli et al.

(10) Patent No.: US 9,493,716 B2
(45) Date of Patent: Nov. 15, 2016

(54) FUEL COMPOSITION WITH ENHANCED LOW TEMPERATURE PROPERTIES

(71) Applicants: Jack Burgazli, Middletown, DE (US); Jerry Burton, Helsby (GB); David A. Daniels, Highlands Ranch, CO (US)

(72) Inventors: Jack Burgazli, Middletown, DE (US); Jerry Burton, Helsby (GB); David A. Daniels, Highlands Ranch, CO (US)

(73) Assignee: Innospec Limited (GB)

( * ) Notice: Subject to any disclaimer, the term of this patent is extended or adjusted under 35 U.S.C. 154(b) by 0 days.

(21) Appl. No.: 13/633,537

(22) Filed: Oct. 2, 2012

(65) Prior Publication Data
US 2013/0025189 A1   Jan. 31, 2013

Related U.S. Application Data

(63) Continuation of application No. 12/171,560, filed on Jul. 11, 2008, now abandoned.

(51) Int. Cl.
| | |
|---|---|
| *C10L 1/18* | (2006.01) |
| *C10L 1/00* | (2006.01) |
| *C10L 1/02* | (2006.01) |
| *C10L 1/14* | (2006.01) |
| *C10L 10/14* | (2006.01) |
| *C10L 1/182* | (2006.01) |
| *C10L 1/185* | (2006.01) |
| *C10L 1/19* | (2006.01) |

(Continued)

(52) U.S. Cl.
CPC ............ *C10L 1/026* (2013.01); *C10L 1/143* (2013.01); *C10L 10/14* (2013.01); *C10L 1/1824* (2013.01); *C10L 1/1826* (2013.01); *C10L 1/1852* (2013.01); *C10L 1/191* (2013.01); *C10L 1/1963* (2013.01); *C10L 1/1985* (2013.01); *C10L 1/224* (2013.01); *C10L 1/2222* (2013.01); *C10L 1/2225* (2013.01); *C10L 1/231* (2013.01); *C10L 1/238* (2013.01); *C10L 1/2383* (2013.01); *C10L 1/2387* (2013.01); *Y02E 50/13* (2013.01)

(58) Field of Classification Search
USPC .................................. 44/354, 302, 397, 307
See application file for complete search history.

(56) References Cited

U.S. PATENT DOCUMENTS

| | | |
|---|---|---|
| 3,320,292 A | 5/1967 | Cahn et al. |
| 4,405,526 A | 9/1983 | Lamberti et al. |

(Continued)

FOREIGN PATENT DOCUMENTS

| | | |
|---|---|---|
| GB | 824447 | 12/1959 |
| KZ | 15021 B | 9/2007 |

(Continued)

OTHER PUBLICATIONS

Supplementary European Search Report and the European Search Opinion in International Patent Application No. PCT/US2009/049778 mailed Mar. 2, 2012.

(Continued)

*Primary Examiner* — Walter D Griffin
*Assistant Examiner* — Chantel Graham
(74) *Attorney, Agent, or Firm* — Janine M. Susan; Burns & Levinson LLP

(57) ABSTRACT

Disclosed herein is a fuel oil composition comprising a renewable fuel or a blend of petroleum based fuels with renewable fuels, also containing an additives composition to enhance the base and combined fuel's resistance to forming insoluble particulates upon storage at diminished operating temperatures. Further described is the additive package used to inhibit particulate formation.

17 Claims, 1 Drawing Sheet

(51) Int. Cl.
*C10L 1/196* (2006.01)
*C10L 1/198* (2006.01)
*C10L 1/222* (2006.01)
*C10L 1/224* (2006.01)
*C10L 1/23* (2006.01)
*C10L 1/238* (2006.01)
*C10L 1/2383* (2006.01)
*C10L 1/2387* (2006.01)

(56) References Cited

U.S. PATENT DOCUMENTS

| | | |
|---|---|---|
| 6,013,114 A | 1/2000 | Hille et al. |
| 6,206,939 B1* | 3/2001 | Botros .................. 44/347 |
| 6,299,655 B1* | 10/2001 | Steckel et al. ............. 44/331 |
| 2001/0003881 A1* | 6/2001 | Ahmed .................. 44/302 |
| 2002/0062053 A1 | 5/2002 | Berlowitz et al. |
| 2003/0158074 A1 | 8/2003 | Haas et al. |
| 2005/0188606 A1* | 9/2005 | Caprotti et al. ............. 44/354 |
| 2006/0236598 A1 | 10/2006 | Selvidge |
| 2008/0092435 A1 | 4/2008 | Bzdek et al. |
| 2008/0092436 A1 | 4/2008 | Seames et al. |
| 2008/0127552 A1 | 6/2008 | Selvidge |
| 2009/0115436 A1* | 5/2009 | Koehler et al. ............. 324/698 |

FOREIGN PATENT DOCUMENTS

| | | |
|---|---|---|
| KZ | 19450 A | 5/2008 |
| WO | 03008471 A1 | 1/2003 |
| WO | 2007113035 A1 | 10/2007 |
| WO | 2007147753 A2 | 12/2007 |
| WO | 2008056203 A1 | 5/2008 |
| WO | 2008084251 A2 | 7/2008 |
| WO | 2009016400 A1 | 2/2009 |

OTHER PUBLICATIONS

International Search Report and Written Opinion of the International Searching Authority in International Patent Application No. PCT/US2009/049778 mailed Mar. 12, 2010.

* cited by examiner

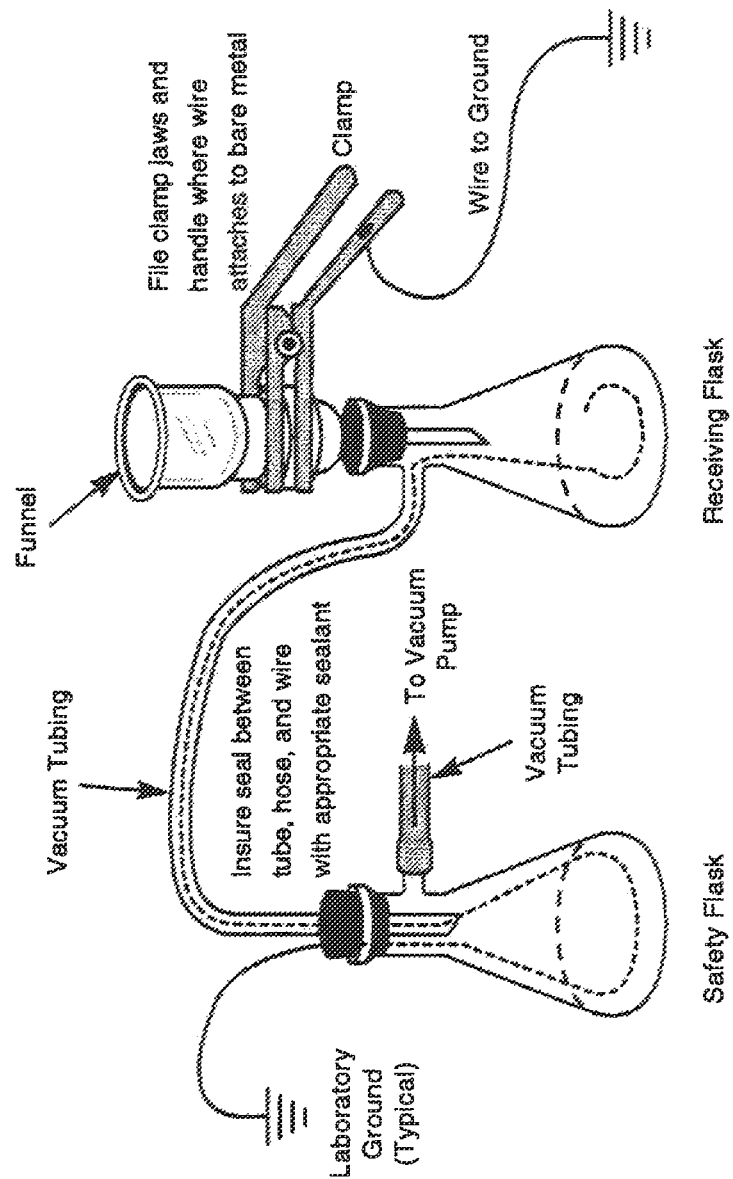

FUEL COMPOSITION WITH ENHANCED LOW TEMPERATURE PROPERTIES

CROSS-REFERENCE TO RELATED APPLICATIONS

This application is a continuation of co-pending U.S. patent application Ser. No. 12/171,560 filed on Jul. 11, 2008 and entitled FUEL COMPOSITION WITH ENHANCED LOW TEMPERATURE PROPERTIES, the contents of which are incorporated by reference herein in their entirety and for all purposes.

FIELD OF THE INVENTION

This invention relates generally to fuel oil compositions. The invention more specifically relates to renewable fuels, and blends of petroleum fuels with renewable fuels, in combination with a novel additive composition designed to diminish particulate formation upon storage of the renewable fuel and renewable fuel petroleum fuel blends.

BACKGROUND OF THE INVENTION

The environmental impact of burning fossil fuels is a widely recognized global issue. There are governmental and civil initiatives to diminishing this detrimental effect. Two of the major initiatives which are affecting the liquid fuel industry are the EPA regulation to limit S content of on-road fuels, and the ever increasing awareness for the need to use renewable fuels.

In order to meet emissions and fuel efficiency goals, automotive Original Equipment Manufacturers (OEM's) are investigating the use of NOx traps, particulate traps and direct injection technologies. Such traps and catalyst systems tend to be intolerant to sulfur, this coupled with the demonstrated adverse environmental consequences of burning sulfur rich fuels has resulted in a global effort to reduce the sulfur content of fuels (Reference World-Wide Fuel Charter, April 2000, Issued by ACEA, Alliance of Automobile Manufacturers, the entire teaching of which is incorporated herein by reference). These low sulfur and ultra-low sulfur fuels are becoming increasingly necessary to ensure compliance with emissions requirements over the full useful life of the latest technological generation of vehicles. Governments are also introducing further legislation for the reduction in particulate matter and fuel emissions.

In the United States, the Environmental Protection Agency (EPA) regulations require that the sulfur content of on road fuel meet the Ultra Low Sulfur specification, specifically less than 15 ppm by mass of sulfur in the finished fuel. Similar regulations are also in place globally.

The method most commonly utilized to reduce the sulfur content of fuels is referred to as "hydro-treating". Hydro-treating is a process by which hydrogen, under pressure, in the presence of a catalyst, reacts with sulfur compounds in the fuel to form hydrogen sulfide gas and a hydrocarbon.

Globally there is a significant desire to utilize "green" or "renewable fuels" as a source of energy. These fuels are gaining popularity due to various social and political factors. The effect of petroleum fuels on carbon dioxide emissions/global warming and the dependence on foreign sources of fuel are a few of the prominent factors driving popular support.

Renewable fuels are gaining greater market acceptance as a cutter stock to extend petroleum diesel market capacity. The blends of renewable fuels with petroleum diesel are being used as a fuel for diesel engines, utilized for heating, power generation, and for locomotion with ships, boats, as well as motor vehicles.

The renewable cutter stock portion of a blended fuel is commonly known as bio-diesel. Bio-diesel is defined as fatty acid alkyl esters of vegetable or animal oils. Common oils used in bio-diesel production are rapeseed, soya, palm, palm kernel, tallow, sunflower, and used cooking oil or animal fats, although more exotic oil sources such as algae derived oils or Jetropha oil are also gaining market interest.

Bio-diesel is prepared by reacting (trans-esterification) whole oils with alcohols (mainly methanol) in the presence of a catalyst (acid or base), such as sodium hydroxide or sodium methoxide. This method of preparing bio-diesel, known as the CD process, is described in numerous patent applications (see, DE-A 4 209 779, U.S. Pat. No. 5,354,878, EP-A-56 25 04, the entire teachings of which are incorporated herein by reference).

Bio-diesel is a legally registered fuel and fuel additive with the U.S. Environmental Protection Agency (EPA). In order for a material to qualify as a bio-diesel, the fuel must meet ASTM D6751 (the entire teaching of which is incorporated herein by reference) for the United States, and EN14214 (the entire teaching of which is incorporated herein by reference) in Europe independent of the oil or fat used or the specific process employed to produce the additive. The ASTM D6751 specification is intended to insure the quality of bio-diesel to be used as a blend stock for 20% and lower blend levels, where as EN14214 is used to ensure quality in 100% bio diesel to be used independently as a fuel as well as Bio diesel to be used to prepare blends with petroleum fuels.

Renewable fuels are also being produced by newer and different processes than the traditional trans-esterification process used to produce conventional biodiesel. Examples of these modern processes include BTL (biomass to liquid) based on Fischer-Tropsch GTL (gas to liquid) technology, and "next generation" bio diesel which utilizes hydro treating of bio derived fats and oils to produce hydrocarbon fuels. Although these renewable fuels have many positive political and environmental attributes, they also have certain negative characteristics which must be taken into consideration when utilizing the material as an alternative fuel or as a blend stock for petroleum diesel. One of the properties which are of particular concern in the industry is the susceptibility of renewable fuels and renewable fuel/petroleum fuel blends to form insoluble particulates during storage.

The present invention addresses fuel industry operability concerns related to particulate formation in renewable fuels as well as renewable fuels/petroleum diesel blends.

BRIEF SUMMARY OF THE INVENTION

The present invention relates generally to fuel compositions. The invention more specifically relates to novel additive composition to inhibit particulate formation in renewable fuels (B100) and renewable fuels/petroleum fuel (Bxx) blends, and to methods of using such compositions.

The renewable fuel composition comprises (i) a renewable component, and (ii) a novel additive composition.

The blended fuel composition comprises (i) a petroleum based component, (ii) a renewable component, and (iii) a novel additive composition.

Another aspect of the invention as described herein is the use of additives such as (a) thermal stabilizers, (b) corrosion inhibitors, (c) cetane improvers, (d) detergents, (e) lubricity improvers, (f) dyes and markers, (g) anti-icing additives, (h)

demulsifiers/anti-haze additives, (i) antioxidants, (i) metal deactivators, (k) biocides, (l) static dissipater additives, (m) low temperature operability/cold flow additives, and (n) antifoams; in combination with the disclosed novel additive composition; in combination with the renewable fuel and novel additive composition; or in combination with the renewable fuel, petroleum fuel blend and the novel additive composition, to not only directly enhance fuel particulate inhibition, but also other fuel properties.

Another embodiment of the present invention is directed toward a method for operating an internal combustion engine such as a compression-ignition engine using as fuel for the engine, a suitable petroleum based component, a suitable renewable based component, and the described novel additive composition.

BRIEF DESCRIPTION OF THE DRAWING

FIG. 1 is a diagram of the receiving flask, 0.7 micron glass fiber filter and funnel as a unit.

DETAILED DESCRIPTION OF THE INVENTION

The present invention relates generally to fuel oil compositions. The invention more specifically relates to one or more renewable fuels in combination with a particulate inhibitor additive composition, or to the blends of petroleum fuels with renewable fuels and the particulate inhibitor additive composition.

Petroleum Fuel

In the present embodiment, the Petroleum Fuel is a hydrocarbon derived from refining petroleum or as a product of Fischer-Tropsch processes (well known to those skilled in the art). The hydrocarbon may also be a solvent. The fuel products are commonly referred to as petroleum distillate fuels.

Petroleum distillate fuels encompass a range of distillate fuel types. These distillate fuels are used in a variety of applications, including automotive diesel engines and in non automotive applications under both varying and relatively constant speed and load conditions such as power generation, marine, rail, farming, and construction equipment applications.

Petroleum distillate fuel oils can comprise atmospheric or vacuum distillates. The distillate fuel can comprise cracked gas oil or a blend of any proportion of straight run or thermally or catalytically cracked distillates. The distillate fuel in many cases can be subjected to further processing such as hydrogen-treatment or other processes to improve fuel properties. The material can be described as a gasoline or middle distillate fuel oil.

Gasoline is a low boiling mixture of aliphatic, olefinic, and aromatic hydrocarbons, and optionally, alcohols or other oxygenated components. Typically, the mixture boils in the range from about room temperature up to about 225° C.

Middle distillates can be utilized as a fuel for locomotion in motor vehicles, air planes, ships and boats as burner fuel in home heating and power generation and as fuel in multi purpose stationary diesel engines.

Engine fuel oils and burner fuel oils generally have flash points greater than 38° C. Middle distillate fuels are higher boiling mixtures of aliphatic, olefinic, and aromatic hydrocarbons and other polar and non-polar compounds having a boiling point up to about 350° C. Middle distillate fuels generally include, but are not limited to, kerosene, jet fuels, and various diesel fuels. Diesel fuels encompass Grades No. 1-Diesel, 2-Diesel, 4-Diesel Grades (light and heavy), Grade 5 (light and heavy), and Grade 6 residual fuels. Middle distillates specifications are described in ASTM D-975, for automotive applications (the entire teaching of which is incorporated herein by reference), and ASTM D-396, for burner applications (the entire teaching of which is incorporated herein by reference).

Middle distillates fuels for aviation are designated by such terms as JP-4, JP-5, JP-7, JP-8, Jet A, Jet A-1. The Jet fuels are defined by U.S. military specification MIL-T-5624-N, the entire teaching of which is incorporated herein by reference, and JP-8 is defined by U.S. Military Specification MIL-T83133-D, the entire teaching of which is incorporated herein by reference. Jet A, Jet A-1 and Jet B are defined by ASTM specification D-1655 and Def. Stan. 91, the entire teachings of which are incorporated herein by reference.

The different fuels described (engine fuels, burner fuels and aviation fuels) each have further to their specification requirements (ASTM D-975, ASTM D-396 and D-1655, respectively) allowable sulfur content limitations. These limitations are generally of the order of up to 15 ppm of sulfur for On-Road fuels, up to 500 ppm of sulfur for Off-Road applications and up to 3000 ppm of sulfur for Aviation fuels.

Renewable Fuel (B100 Fuels)

In the present embodiment, a Renewable Fuel is an organic material that is derived from a natural, replenishable feed stock which can be utilized as a source of energy. Suitable examples of renewable fuels include, but are not limited to, bio-diesel, ethanol and bio-mass. Other renewable materials are well known to those skilled in the art.

In the present embodiment, "bio-diesel" refers to all mono-alkyl esters of long chain fatty acids derived from vegetable oils or animal fats.

Bio-diesel is commonly produced by the reaction of whole oils with alcohols in the presence of a suitable catalyst. Whole oils are natural triglycerides derived from plant or animal sources. The reaction of whole oil with an alcohol to produce a fatty acid ester and glycerin is commonly referred to as trans esterification. Alternatively, bio-diesel can be produced by the reaction of a fatty acid with an alcohol to form the fatty acid ester.

The fatty acid segments of triglycerides are typically composed of $C_{10}$-$C_{24}$ fatty acids, where the fatty acid composition can be uniform or a mixture of various chain lengths. The bio-diesel according to the invention may comprise single feed sourced components, or blends of multiple feed stocks derived from vegetable(s), or animal(s) origin. The commonly used single or combination feed stocks include, but are not limited to, coconut, corn, castor, jetropha, linseed, olive, palm, palm kernel, peanut, rapeseed, safflower, sunflower, soybean, tall oil, tallow, lard, yellow grease, sardine, menhaden, herring and used cooking oils and fats.

Suitable alcohols used in either of the esterification processes can be aliphatic or aromatic, saturated or unsaturated, branched or linear, primary, secondary or tertiary, and may possess any hydrocarbon chain having lengths from about C-1 to about C-22. The industry and typical choice being identified as methanol.

Bio-diesel composition is established by specification parameters set forth in international specifications such as EN12214 and ASTM D6751 (the entire teaching of which are incorporated herein by reference). The fatty acid ester must meet and maintain the established specification parameters set forth in EN14214 or ASTM D6751, regardless of the whole oil feed source or the process utilized for its production.

ASTM D6751 specification outlines the requirements for bio-diesel (B100) to be considered as a suitable blending stock for hydrocarbon fuels. EN14214 specifies requirements of bio diesel to be used as both a fuel and as a blend stock for blending with distillate fuels.

Renewable fuel can also encompass in addition to bio diesel products produced from hydro treatment of oils and fats, and also products of BTL processes. These processes are well known to those skilled in the art.

Renewable Fuel, Petroleum Fuel Blend (Bxx Fuels)

The renewable fuel and petroleum fuel can be blended in any proportion necessary wherein the final oil blend is appropriate to be utilized as a fuel.

In the scope of the invention, the fuel can contain about 100% renewable fuels, however, the renewable content of the blend is typically up to about 50% by volume of the finished fuel blend, more typically up to about 35% by volume of the finished fuel blend, and alternatively up to about 20% by volume of the finished fuel blend.

The invention can be practiced at high renewable fuel concentrations, wherein the renewable fuel content is greater than about 15% by volume of the finished fuel blend. The invention is also applicable at renewable fuel concentrations as low as about 15, 12.5, 12, 11, and 10% by volume of the finished fuel blend, and even at very low renewable fuel concentrations as low as about 7.5, 5, 3, 2, 1, and 0.5% by volume of the finished fuel blend.

Particulate Inhibition Analyzed

During the research and development efforts to evaluate low temperature operability properties of renewable fuels and renewable fuel petroleum fuel blend fuels, it was discovered that use of certain additive compositions can have a marked effect on retarding insoluble material formation upon storage of renewable fuels and renewable fuel petroleum fuel blend fuels at diminished temperatures.

The possible causes of particulate formation are not fully understood. However, industry technical leaders in Europe and United States postulate the particulates may be due to very low concentration of products of incomplete trans-esterification such as mono-, di- and triglycerides, glycerine derivatives (glycerides), natural sterols, or even saturated fatty acid methyl esters present in the fuel.

These materials are believed to fall out of solution during extended storage or cooling and eventually build large enough particles to block fuel delivery systems.

Renewable fuel producers are attempting to make manufacturing changes to address these problems. The primary modification in manufacturing has been to institute a cold filtration step to remove any insoluble materials that readily precipitate out of the renewable fuel. However these precautions have not been fully effective in addressing all particulate forming material in the fuel.

Based on fuel industry experience, it is assumed that the particulate formation problems in renewable fuels (B100-100% FAME) and renewable fuel/petroleum fuel blends (Bxx blends) maybe attributed to the poor low temperature operability properties of the renewable fuels and renewable fuel/petroleum fuel blends.

Historically Low Temperature Operability (LTO) of fuel is a measure of the inherent handling and use characteristics of the fuel at diminished temperatures. A petroleum base fuel's LTO is estimated by its cloud point (CP), pour point (PP) and it's Cold Filter Plugging Point (CFPP). In Canada another method, Low Temperature Flow Test (LTFT) is also employed.

The Cold Filter Plugging Point of a fuel is the temperature at and below which wax in the fuel will cause severe restrictions to flow through a filter screen. CFPP is believed to correlate well with vehicle operability at lower temperatures.

CFPP of petroleum fuels in evaluated using ASTM D6371 (the entire teaching of which is incorporated herein by reference), IP-309 (the entire teaching of which is incorporated herein by reference), and EN-116 (the entire teaching of which is incorporated herein by reference).

Low Temperature Flow Test (LTFT) is very similar in principle and function to CFPP and is evaluated using ASTM D4539 (the entire teaching of which is incorporated herein by reference).

The petroleum diesel filtration methods (CFPP, and LTFT) are referred to as surrogate test methods. These methods try to predict the behavior of the fuel with respect to actual engine operating conditions. There is substantial industry data relating CFPP with actual field operability. The Cloud Point or wax appearance temperature (WAT) of a fuel is the point at which first visible crystals are detected in the fuel. Cloud point can be evaluated using ASTM D2500, D5771, D5772, and D5773 (visible method), the entire teachings of which are incorporated herein by reference, and by IP-389 (crystal formation method), the entire teaching of which is incorporated herein by reference.

The Pour Point is a standardized term for the temperature at which an oil, for example, mineral oil, diesel fuel or hydraulic oil, stops flowing upon cooling. Pour point of petroleum fuels can be evaluated using ASTM D97 (the entire teaching of which is incorporated herein by reference), and ISO-3016 (the entire teaching of which is incorporated herein by reference).

The petroleum diesel physical evaluation methods (PP and CP) are methods used to evaluate the fuel low temperature characteristics. While these methods are not directly considered as a surrogate test for engine performance, there is a common belief/practice in the petroleum industry, wherein the use of a fuel's cloud point is a very conservative predictor of fuel field operability. Specifically, if the fuel is stored and used above the fuels cloud point, there are rarely if any field issues attributable to fuel low temperature properties.

The current conventional diesel fuel low temperature operability methods while being used extensively in the fuel industry to predict fuel handling and use properties of petroleum fuels, have not been found to be fully applicable to detect or predict field problems associated with filter plugging in renewable fuels and renewable fuel petroleum fuel blends.

This failure is directly evident in the CP method. Field issues have arisen wherein B100, or Bxx fuels stored for as little as 24 hours at temperatures above their cloud point have resulted in filter plugging issues attributable to insoluble particulate formation. Commonly the use of CP of a petroleum fuel is considered as the most conservative predictor of fuel low temperature operability. Generally LTO problems with petroleum diesel are rarely, if ever encountered when operating above the cloud point of the petroleum fuels.

The inapplicability of standard petroleum test can be due to the new particulate formation phenomenon encountered with renewable fuels and renewable fuel/petroleum fuel blends. The new phenomenon can be caused by different chemical species in petroleum fuels, as compared to renewable fuels and renewable fuel/petroleum fuel blends and also possibly the difference in particulate formation mechanisms between petroleum fuels and renewable fuels or renewable fuel/petroleum fuel blends.

The formation of insoluble particulates upon storage of renewable fuels as well as renewable fuel/petroleum fuel blends have greatly increased the complexity of field operability properties of fuels.

It is therefore anticipated that in certain climate regions, difficulties associated with engines, such as clogging of fuel passages or fuel filters, may occur in normal temperature ranges of engine operation.

While there have been low temperature operability problems associated with desulphurization of petroleum fuels, the diminished low temperature operability characteristic such as deteriorated fluidity at low temperature (i.e. increased pour point and/or cold filter plugging point) have been as a whole anticipated by the fuel industry. Additive packages to address ULSD CFPP, CP, and PP issues are currently available, and for the most part have been successful in treating ULSD low temperature issues.

The new particulate formation problems encountered with renewable fuels (B100-100% FAME) and renewable fuel/petroleum fuel blends (Bxx blends) have not previously been recognized in the industry, or the issues resolved by the use of currently known or used fuel additives.

The invention disclosed herein enhances the resistance of the renewable fuel or the renewable fuel petroleum fuel blend to forming insoluble particulates during extended storage or low temperature operation.

Particulate Inhibitor Additive Composition

In the context of this invention, Agglomerates are defined as union of similar or dissimilar materials to form a large mass. Conglomerates are defined as a union of agglomerates to form a larger mass. Particulates are defined as a union of conglomerates and agglomerates to form an even larger mass.

An embodiment of the invention is the use of an additive composition to inhibit agglomeration, conglomeration and particulate formation in renewable fuels, and in mixtures of renewable fuels and petroleum fuels The novel additive composition selected to inhibit agglomeration, conglomeration and particulate formation in fuels is composed of a combination of any one of the material consisting of i) Agglomeration Retarders, ii) Particulate Dispersants, iii) Particulate Settling Inhibitor, and iv) Compatibility Enhancers.

Agglomeration Retarders

Agglomeration Retarders are materials which inhibit the initial association of hydrocarbon oxygenates like Fatty acid Methyl Esters (FAME) as contained in bio diesel with other FAME's for B100 fuels, and in the case of blended fuel, the association of FAME components with other FAME's or with hydrocarbon or paraffin components in petroleum fuels. The inhibition results in a retardation of the rate of association of molecules required to form agglomerates.

The Agglomeration Retarders utilized in the formulation are selected from a group consisting of polymers derived from derivatized acrylic acid monomers.

An embodiment of the invention is an Agglomeration Retarder consisting essentially of homopolymers or co polymers of acrylic acid, or acrylic acid derivatives.

The monomers which can be utilized to prepare the acrylate polymers are selected from the group described by general formulas I and II.

General Formula I

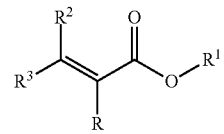

(I)

wherein
R=a hydrogen atom, or an optionally substituted hydrocarbon group having from 1 to 30 carbon atoms;
$R^1$=H, or an optionally substituted hydrocarbon group having from 1 to 30 carbon atoms;
$R^2$=a hydrogen atom, or an optionally substituted $C_{1-8}$ alkyl group; and
$R^3$=a hydrogen atom, or an optionally substituted $C_{1-8}$ alkyl group; or
$R^2$ and $R^3$ together with the connected carbon atom represent an optionally substituted cycloalkyl or cycloalkylene ring having 5-20 carbon ring atoms;

General Formula (II)

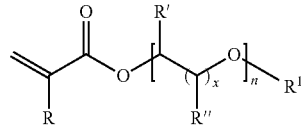

wherein:
R=a hydrogen atom, or an optionally substituted hydrocarbon group having from 1 to 30 carbon atoms
R', R"=a hydrogen atom or an optionally substituted, $C_{1-8}$ alkyl group
$R^1$=H, or an optionally substituted hydrocarbon group having from 1 to 30 carbon atoms
x=between 0-5
n=between 1 and 100.

The term "hydrocarbon" as used herein means any one of a saturated or unsaturated alkyl group, wherein groups may be linear, branched or cyclic, or a substituted or un-substituted aryl group.

Suitable examples of optional substituents include; nitro groups, alkyl groups, alkoxy, alkylthio, cyano, alkoxycarbonyl, alkylamino, dialkylamino, (alkylcarbonyl)alkylamino, (alkoxycarbonyl)-alkylamino, alkylcarbonylamino, alkoxycarbonylamino and carboxylic, alkylcarboxylic (ester) and hydroxyl groups.

An alkyl moiety as described as R', R" selected as an optional subsistent suitably has up to 8 carbon atoms, preferably up to 4, and especially 1 or 2 carbon atoms. If having more than two carbon atoms they may be branched, but are preferably linear.

Preferably R represents a hydrogen atom or an optionally substituted $C_{1-4}$ alkyl group. Most preferably R represents a hydrogen atom or a methyl group.

Preferably $R^1$ represents an optionally substituted (but preferably unsubstituted) alkyl group or alkylene group or fatty acid group or aryl group (for example a benzyl group). Most preferably it represents an unsaturated alkyl group. Preferably $R^1$ has 8 or more carbon atoms, preferably 10 or more, and more preferably 12, or more.

Preferably $R^2$ and $R^3$ represent a hydrogen atom or an optionally substituted $C_{1-4}$ alkyl group. Most preferably $R^2$ and $R^3$ represent a hydrogen atom or a methyl group.

The proportions of monomers of type I or type II, or multiple monomers of a single type can be varied to meet required properties, with the total adding up to 100 wt %.

Preferably the number average molecular weight (Mn) of the acrylate polymer is in the range 750 to 100,000, more preferably 1,000 to 50,000, and most preferably 2,000 to 40,000 amu's.

The process of preparing these materials is described in U.S. Pat. No. 6,409,778 (the entire teachings of which are incorporated herein by reference).

The Agglomeration Retarders are present in the formulation in the range of about 0% to about 80%, more preferably between about 0.1% to about 70.0% v/v, even more preferably between about 10.0% to about 65.0% v/v, and most preferably between about 20.0% to about 60.0% v/v of the additive composition.

Particulate Dispersants

Particulate Dispersants are materials which inhibit the association of agglomerated Fatty acid Methyl Esters, or agglomerated FAME's and hydrocarbon or paraffin components forming larger conglomerates, and further result in an inhibition of the association of conglomerates required to form particulates.

Particulate dispersants as described in the present invention are any suitable nitrogen-containing detergent or dispersant known in the art for use in lubricants or fuel oils.

Preferably the dispersant is selected from:
(i) Substituted Amines,
(ii) Acylated Nitrogen Compounds, and
(iii) Nitrogen-Containing Condensates of a phenol and an aldehyde.

i) Substituted Amines; wherein the amine Nitrogen is directly attached to a hydrocarbon. The term "hydrocarbon" as used herein means any one of a saturated or unsaturated alkyl group, wherein groups may be linear, branched or cyclic, or a substituted or un-substituted aryl group.

Substituted Amines can be described as hydrocarbyl amines, wherein hydrocarbyl as used herein denotes a group having a carbon atom directly attached to the remainder of the molecule. The hydrocarbyl substituent in such amines contain at least 8 and up to about 50 carbon atoms. Hydrocarbyl substituents can comprise up to about 200 carbon atoms. Examples of hydrocarbyl groups include but are not limited to methyl, ethyl, propyl, isopropyl, butyl and isomers and polymers thereof.

Substituted Amines can be described as Aromatic amines or Aromatic polyamines of the general formula:

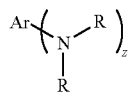

wherein,
Ar is an aromatic nucleus of 6 to 20 carbon atoms,
R is H, $C_{1-30}$, and
z is from 2 to 8.

Specific examples of the aromatic polyamines are the various isomeric phenylene diamines, the various isomeric naphthalene diamines, etc.

Substituted Amines can be described as polyamines wherein the polyamines can be described by the general formula:

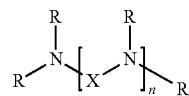

wherein
R=hydrogen, a hydrocarbyl,
R=1-30 carbon atoms, with proviso that at least one R is a hydrogen atom,
n=whole number from 1 to 10 and
$X=C_{1-8}$.

Preferably each R is independently selected from hydrogen, or a hydrocarbyl group. Examples of a hydrocarbyl groups include but are not limited to methyl, ethyl, propyl, isopropyl, butyl and isomers and polymers thereof. X is preferably a $C_{1-8}$ alkylene group, most preferably ethylene, and n can be an integer from 0 to 10.

Substituted Amines can be a mixture of polyamines for example a mixture of ethylene polyamines. Specific examples of polyalkylene polyamines (1) include ethylenediamine, triethylenetetramine, tetraethylenepentanmine, tri-(trimethylene)tetramine, pentaethylenehexamine, hexaethyleneheptamine, 1,2-propylenediamine, and other commercially available materials which comprise complex mixtures of polyamines.

Alternatively the amine or polyamine may be a hydroxyalkyl-substituted amine or polyamine wherein the parent amine or poly amine can also be converted to their corresponding alkoxylates. The alkoxylates are products derived from the reaction of 1-100 molar equivalents of an alkoxylating agent with the nitrogen moiety. The required alkoxylating agents are chosen from the group comprising: ethylene oxide, propylene oxide, butylene oxide and epichlorohydrin, or their mixtures. The alkoxylates can be produced from a single alkoxylating agent or alternatively from a mixture of agents. The alkoxylate derived from mixtures of alkoxylating agents can be prepared by stepwise addition of the agents to the amine to form block polymers, or can be added as mixed agents to form random block/alternating alkoxylates.

Substituted amines can include heterocyclic substituents selected from nitrogen-containing aliphatic and aromatic heterocycles, for example piperazines, imidazolines, pyrimidines, morpholines, etc.

Specific examples of the heterocyclic-substituted polyamines (2) are N-2-aminoethyl piperazine, N-2 and N-3 amino propyl morpholine, N-3(dimethyl amino)propyl piperazine, 2-heptyl-3-(2 aminopropyl)imidazoline, 1,4-bis(2-aminoethyl)piperazine, 1-(2-hydroxy ethyl)piperazine, and 2-heptadecyl-1-(2-hydroxyethyl)-imidazoline, etc.

(ii) Acylated nitrogen compounds: A typical class of acylated nitrogen compounds suitable for use in the present invention is those formed by the reaction of a carboxylic acid-derived acylating agent and an amine. In such compositions the acylating agent is linked to the amino compound through an imido, amido, amidine or acyloxy ammonium linkage.

The acylating agent can vary from formic acid and its acylating derivatives to acylating agents having high molecular weight of the aliphatic substituents of up to 5,000, 10,000 or 20,000 amu. The acylating agent may be a mono- or polycarboxylic acid (or reactive equivalent thereof), for example a substituted succinic, or phthalic acid.

The acylating agent commonly possesses a hydrocarbyl substituent. The term "hydrocarbyl" as used herein denotes a group having a carbon atom directly attached to the remainder of the molecule.

The hydrocarbyl substituent in such acylating agents preferably comprises at least 10, more preferably at least 12, for example 30 or 50 carbon atoms. Hydrocarbyl substituents can comprise up to about 200 carbon atoms.

Preferably the hydrocarbyl substituent of the acylating agent has a number average molecular weight (Mn) of between 170 to 2800, for example from 250 to 1500, preferably from 500 to 1500 and more preferably 500 to 1100. An Mn of 700 to 1300 is especially preferred.

Illustrative hydrocarbyl substituent groups include n-octyl, n-decyl, n-dodecyl, tetrapropenyl, n-octadecyl, oleyl, chloroctadecyl, triicontanyl, etc.

The hydrocarbyl based substituents may be made from homo- or interpolymers (e.g. copolymers, terpolymers) of mono- and di-olefins having 2 to 10 carbon atoms, for example ethylene, propylene, butane-1, isobutene, butadiene, isoprene, 1-hexene, 1-octene, etc. Preferably these olefins are 1-monoolefins. The hydrocarbyl substituent may also be derived from the halogenated (e.g. chlorinated or brominated) analogs of such homo- or interpolymers.

Alternatively the substituent may be made from other sources, for example monomeric high molecular weight alkenes (e.g. 1-tetracontene) and chlorinated analogs and hydrochlorinated analogs thereof, aliphatic petroleum fractions, for example paraffin waxes and cracked and chlorinated analogs and hydrochlorinated analogs thereof, white oils, synthetic alkenes for example produced by the Ziegler and other methods known to those skilled in the art. Any unsaturation in the substituent may if desired be reduced or eliminated by hydrogenation according to procedures known in the art.

Suitable hydrocarbyl based groups may contain non-hydrocarbon moieties. For example they may contain up to one non-hydrocarbyl group for every ten carbon atoms provided this non-hydrocarbyl group does not significantly alter the predominantly hydrocarbon character of the group.

Those skilled in the art will be aware of such groups, which include for example hydroxyl, halo (especially chloro and fluoro), alkoxyl, alkyl mercapto, alkyl sulfoxy, etc. Preferred hydrocarbyl based substituents are purely aliphatic hydrocarbon in character and do not contain such groups.

The hydrocarbyl-based substituents are preferably predominantly saturated, that is, they contain no more than one carbon-to-carbon unsaturated bond for every ten carbon-to-carbon single bonds present.

Most preferably they contain no more than one carbon-to-carbon non-aromatic unsaturated bond for every 50 carbon-to-carbon bonds present, and containing more than 8 carbon atoms. Preferred polymeric hydrocarbyl-based substituents are poly-isobutenes known in the art.

The nitrogen compounds can vary from ammonia itself to hydrocarbyl amines. Hydrocarbyl as used herein denotes a group having a carbon atom directly attached to the remainder of the molecule. The hydrocarbyl substituent in such amines contain at least 8 and up to about 50 carbon atoms. Hydrocarbyl substituent can comprise up to about 200 carbon atoms. Examples of a hydrocarbyl groups include but are not limited to methyl, ethyl, propyl, isopropyl, butyl and isomers and polymers thereof.

Hydrocarbyl-Substituted Amines suitable for use in the fuel compositions of the present invention are well known to those skilled in the art and are described in a number of patents. Among these is U.S. Pat. Nos. 3,275,554; 3,438,757; 3,454,555; 3,565,804; 3,755,433 and 3,822,209 (the entire teachings of which is incorporated herein by reference). These patents describe suitable hydrocarbyl amines for use in the present invention including their method of preparation.

The amino compound can be a polyamine or a mixture of polyamines, for example a mixture of ethylene polyamines. Poly amino compounds useful for reacting with acylating agents include polyalkylene polyamines of the general formula:

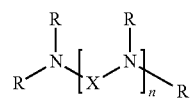

wherein
R=hydrogen, a hydrocarbyl,
R=1-30 carbon atoms, with proviso that at least one R is a hydrogen atom,
n=whole number from 1 to 10 and
X=$C_{1-8}$.

Preferably each R is independently selected from hydrogen, or a hydrocarbyl group. Examples of a hydrocarbyl group include but are not limited to methyl, ethyl, propyl, isopropyl, butyl and isomers and polymers thereof. X is preferably a $C_{1-8}$ alkylene group, most preferably ethylene, and n can be an integer from 0 to 10.

Specific examples of polyalkylene polyamines (1) include ethylene diamine, diethylenetriamine, tetraethylenepentamine, tri-(trimethylene)tetramine, pentaethylenehexamine, hexaethyleneheptamine, 1,2-propylenediamine, and other commercially available materials which comprise complex mixtures of polyamines.

Alternatively the amine or polyamine may be a hydroxyalkyl-substituted amine or polyamine wherein the parent amine or poly amine can also be converted to their corresponding alkoxylates. The alkoxylates are products derived from the reaction of 1-100 molar equivalents of an alkoxylating agent with the nitrogen moiety. The required alkoxylating agents are chosen from the group comprising: ethylene oxide, propylene oxide, butylene oxide and epichlorohydrin, or their mixtures. The alkoxylates can be produced from a single alkoxylating agent or alternatively from a mixture of agents. The alkoxylate derived from mixtures of alkoxylating agents can be prepared by stepwise addition of the agents to the amine to form block polymers, or can be added as mixed agents to form random block/alternating alkoxylates. These oxyalkylates can also be further derivatized with organic acids to form esters.

Typical acylated nitrogen compounds are formed by the reaction of a molar ratio of acylating agent:nitrogen compound of from 10:1 to 1:10, preferably from 5:1 to 1:5, more preferably from 2:1 to 1:2 and most preferably from 2:1 to 1:1. This type of acylated nitrogen compounds compound and the preparation thereof is well known to those skilled in the art A further type of acylated nitrogen compound suitable for use in the present invention is the product of the reaction of a fatty monocarboxylic acid of about 10-30 carbon atoms and the afore-described alkylene amines, typically, ethylene, propylene or trimethylene polyamines containing 2 to 10 amino groups and mixtures thereof.

A type of acylated nitrogen compound belonging to this class is that made by reacting an hydrocarbyl amine or poly amine with substituted succinic acids or anhydrides, or with aliphatic mono-carboxylic acids having from 2 to about 22 carbon atoms.

Typical of the monocarboxylic acids are formic acid, acetic acid, dodecanoic acid, butanoic acid, oleic acid, stearic acid, the commercial mixture of stearic acid isomers known as isostearic acid, tolyl acid, etc. Such materials are more fully described in U.S. Pat. Nos. 3,216,936 and 3,250,715 (the entire teachings of which is incorporated herein by reference). The fatty mono-carboxylic acids are generally mixtures of straight and branched chain fatty carboxylic acids containing 10-30 carbon atoms. These include but are not limited to Rapeseed Oil Fatty Acid, and Tall Oil Fatty Acids (TOFA). Fatty dicarboxylic acids can also be used.

The mixture of fatty acids contain from 5 to about 30 mole percent straight chain acid and about 70 to about 95 percent mole branched chain fatty acids. Among the commercially available mixtures are those known widely in the trade as isostearic acid. These mixtures are produced as a by-product from the dimerization of unsaturated fatty acids as described in U.S. Pat. Nos. 2,812,342 and 3,260,671 (the entire teachings of which is incorporated herein by reference).

The branched chain fatty acids can also include those in which the branch may not be alkyl in nature, for example phenyl and cyclohexyl stearic acid and the chloro-stearic acids. Branched chain fatty carboxylic acid/alkylene polyamine products have been described extensively in the art. See for example, U.S. Pat. Nos. 3,110,673; 3,251,853; 3,326,801; 3,337,459; 3,405,064; 3,429,674; 3,468,639; 3,857,791 (the entire teachings of which is incorporated herein by reference).

Acylated nitrogen compounds of this class can alternatively be prepared by reacting a poly(isobutene)-substituted succinic acid-derived acylating agent (e.g. anhydride, acid, ester, etc.) wherein the poly(isobutene) substituent has between about 12 to about 200 carbon atoms with a mixture of ethylene polyamines having 3 to about 9 amino nitrogen atoms per ethylene polyamine and about 1 to about 8 ethylene groups.

Many patents have described useful acylated nitrogen compounds including U.S. Pat. Nos. 3,172,892; 3,219,666; 3,272,746; 3,310,492; 3,341,542; 3,444,170; 3,455,831; 3,455,832; 3,576,743; 3,630,904; 3,632,511; 3,804,763, 4,234,435 and U.S. Pat. No. 6,821,307 (the entire teachings of which is incorporated herein by reference).

(iii) Nitrogen-Containing Condensates of Phenols, Aldehydes, and Amino Compounds: Phenol/aldehyde/amine condensates are useful as dispersants in the fuel. The compositions of the present invention include those generically referred to as Mannich condensates.

Mannich compounds can be made by reacting simultaneously or sequentially at least one active hydrogen compound for example a hydrocarbon-substituted phenol (e.g. an alkyl phenol wherein the alkyl group has at least an average of about 8 to 200; preferably at least 12 up to about 200 carbon atoms) having at least one hydrogen atom bonded to an aromatic carbon, with at least one aldehyde or aldehyde-producing material (typically formaldehyde or a precursor thereof) and at least one amino or polyamino compound having at least one NH group.

The amino compounds include primary or secondary monoamines having hydrocarbon substituents of 1 to 30 carbon atoms or hydroxyl substituted hydrocarbon substituents of 1 to about 30 carbon atoms.

Another type of typical amino compound is the polyamines described above in relation to acylated nitrogen-containing compounds.

The Particulate Dispersants are present in the formulation in the range of about 0% to about 70%, more preferably between about 0.1% to about 60.0% v/v, even more preferably from about 10.0% to about 55.0% v/v, and most preferably between about 20.0% to about 50.0% v/v of the additive composition.

Particulate Settling Inhibitor

Particulate Settling Inhibitors are materials which inhibit conglomerated Fatty Acid Methyl Esters, or conglomerated FAME's and hydrocarbon or paraffin components forming larger conglomerates, and inhibition these conglomerates from settling out of solution.

Three polymer families are considered suitable polymers as part of the invention to function as Particulate Settling Inhibitors. These are hydrocarbon polymers, oxyalkylene polymers and nitrogen containing polymers.

Hydrocarbon polymers which can be used in accordance with the invention are homo polymers and copolymers of two or more of ethylenically unsaturated monomers, selected from the group consisting of; alpha-olefins (e.g. styrene, 1-octene), unsaturated esters (eg. vinyl acetate), and unsaturated acids and their esters (eg. fumaric, itaconic acids, maleic anhydride and phthallic anhydride).

The preferred polymers can be described by the general formula:

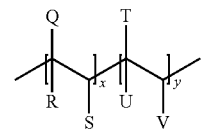

wherein:
R=H, hydrocarbyl, or hydrocarbylene; with from 1 to 30 carbon atoms, or aryl or Q,
Q=R, COOR, OCOR, COOH, or OR,
S=H or Q
T=H, R, COOR, or an aryl or heterocyclic group,
U=H, COOR, OCOR, OR, or COOH,
V=H, R, COOR, OCOR, COOH, or COOH
x and y represent mole fractions (x/y) of monomers, preferably within the range of from about 2.5 to about 0.4.

It is generally desirable to utilize homo polymers or a copolymer having at least 25 and preferably at least 40, more preferably at least 50, molar percent of the units which have side chains containing at least 6, and preferably at least 10 atoms.

The suitable molar ratios of monomers in the co polymer are preferably in the range of about 3 to 1 and 1 to 3.

Olefins that can be copolymerized with e.g. maleic anhydride include 1-decene, 1-dodecene, 1-tetradecene, 1-hexadecene, and 1-octadecene. The acid or anhydride group of the polymer can be esterified by any suitable technique and although preferred it is not essential.

Alcohols which can be used include normal alcohols such as n-decan-1-ol, n-dodecan-1-ol, n-tetradecan-1-ol, n-hexadecan-1-ol, and n-octadecan-1-ol and branched alcohols such as 1-methylpentadecan-1-ol or 2-methyltridecan-1-ol or a mixture thereof.

The particularly preferred polymers are those having a number average molecular weight, as measured by vapor phase osmometry, of 1,000 to 100,000, more especially 1,000 to 30,000.

The polyoxyalkylene polymers which can be used in accordance with the invention are polyoxyalkylene esters, ethers, ester/ethers and mixtures thereof, particularly those containing at least one, preferably at least two, $C_{10}$ to $C_{30}$ alkyl groups and a polyoxyalkylene glycol group of molecular weight up to 5,000, preferably about 200 to about 5,000, and the alkyl spacer group in said polyoxyalkylene glycol containing from 1 to 6 carbon atoms.

The preferred esters, ethers or ester/ethers can be described by the general formula:

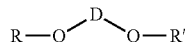

wherein R and R' may be the same or different, and represented by
R, R'=n-alkyl-, n-alkyl-CO—, n-alkyl-O—CO(CH2)x-, or n-alkyl-O—CO(CH2)x-CO—
D=polyalkylene;
x is an integer from 1 to 60.

The polyalkylene spacer segment (D) of the glycol can encompass an alkylene group, in which the alkylene group has 1 to 6 carbon atoms. The spacer can be linear or branched. Common glycol spacer segments are methylene, ethylene, trimethylene, tetramethylene hexamethylene moieties which are substantially linear, and propylene which has some degree of branching.

Nitrogen containing polymer where the polymer is composed of derivatives of a primary or secondary amine, wherein an amine has been converted to an amide, imide, imidazoline, carbamate, urea, imine, or an enamine.

The nitrogen atom can be attached to a linear, branched, saturated, unsaturated or a cyclic, hydrocarbon; or to aromatic or poly aromatic groups, to hydrogens, or to a combination of these groups. A non-exclusive list of chain lengths attached to the nitrogen atom are in the range of about $C_1$-$C_{30}$ such as butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, uneicosyl, docosyl, tricosyl, and tetracosyl, and in the case of secondary amines, the combinations in the range of about $C_1$-$C_{30}$, are also suitable.

The amine functional class may also include poly amines. The poly amines are described by the formula:

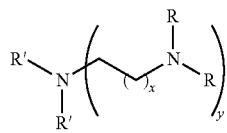

wherein:
R, R' can be a linear alkyl, a branched alkyl containing 1 to 30 carbon atoms, aromatic, cyclic, polycyclic, poly alkoxy, or carbonyl,
R, R' alternatively contain hetero atoms such as O, N, S, and P,
R' and R' alternatively are incorporated in a ring system containing 3-12 members;
x can be 1-6; and
y can be 1-6.

Suitable polyamines of the present invention are the polyethylene poly amines such as EDA (ethylenediamine), DETA (diethylenetriamine), TETA (triethylenetetraamine) and their higher homologs; their alkyl analogs (as exemplified, but not limited to, N-coco-ethylenediamine, N-oleyl-ethyenediamine, and N-buty)-ethylenediamine), and their analogs based on other industrially available spacers such as propyl and hexyl (as exemplified, but not limited to, dipropylenetriamine, and bis-hexamethylenetriamine); and their subsequent derivatives such as; ester amines, amido amines, imido amines, imidazolines, carbamates, ureas, imines, and enamines.

The parent amine or poly amine can also be converted to their corresponding alkoxylates. The alkoxylates are products derived from the reaction of 1-100 molar equivalents of an alkoxylating agent with the nitrogen moiety. The required alkoxylating agents are chosen from the group comprising: ethylene oxide, propylene oxide, butylene oxide and epichlorohydrin, or their mixtures. The alkoxylates can be produced from a single alkoxylating agent or alternatively from a mixture of agents. The alkoxylate derived from mixtures of alkoxylating agents can be prepared by stepwise addition of the agents to the amine to form block polymers, or can be added as mixed agents to form random block/alternating alkoxylates. These oxyalkylates can also be further derivatized with organic acids to form esters.

The Particulate Settling Inhibitors are present in the formulation in the range of about 0% to about 70%, more preferably between about 0.1% to about 60.0% v/v, even more preferably between about 10.0% to about 55.0% v/v, and most preferably between about 20.0% to about 50.0% v/v of the additive composition.

Compatibility Enhancers

Compatibility Enhancers are materials which are believed to solubilize and break up agglomerated or conglomerated Fatty Acid Methyl Esters, or agglomerated or conglomerated FAME's and hydrocarbon or paraffin components, and retard their dissolution from the bulk fuel.

The Compatibility Enhancer in the formulation may be a single compound or a combination of compounds so as to form an intertwined synergistic matrix. In some embodiments, the Compatibility Enhancers are selected from monofunctional alcohols, glycols, polyols, esters, ethers, glycol ether acetates, ketones, glycol ethers, amides, amines, nitro compounds and combinations of two or more of the foregoing.

In some embodiments, at least one of the Compatibility Enhancers is a monofunctional alcohol. Examples of monofunctional alcohols include $C_1$-$C_{30}$ alcohols, wherein the hydrocarbon portion of the alcohol can be linear, branched, saturated, unsaturated, or cyclic, or an aromatic or poly aromatic.

Some examples of mono-functional alcohols include n-propyl alcohol, isopropyl alcohol, n-butyl alcohol, amyl alcohol, 2-ethylhexanol, decyl alcohol, and 1-octadecanol.

In some embodiments, at least one of the Compatibility Enhancers is a polyol. Some examples of polyols include glycols such as ethylene glycol, polyethylene glycol, propylene glycol, diethylene glycol, dipropylene glycol, triethylene glycol, tripropylene glycol. In some embodiments, the polyol used is propylene glycol.

In some embodiments, at least one of the Compatibility Enhancers is a glycol ether. As used throughout this application, a "glycol ether" shall define a molecule having the structure of a glycol, except that the molecule possesses an ether linkage to an alkyl group from one of the oxygen atoms in the glycol. Thus a mono-alkyl ether of ethylene glycol, for example, has the structure of ethylene glycol with an ether linkage connected to an alkyl group instead of one of the two hydroxyl groups normally found on ethylene glycol. By way of further example, "ethylene glycol mono butyl ether" refers to a molecule having the structure of ethylene glycol with an ether linkage connected to a butyl group. Further, a reference to a number of carbons on the ether refers to the number of carbons in an alkyl group attached to the ether linkage. Thus, a "$C_3$-$C_{10}$ glycol ether" refers to a glycol ether in which the alkyl group attached to the ether has three to ten carbons.

In some embodiments, the glycol ether Compatibility Enhancer includes more than one ether linkage defined as a polyglycol ether. The polyglycol ethers are generally products of an alcohol reacted with ethylene or propylene oxide. The repeating glycol unit is preferably less than 16 more preferably less than 8, and most preferably 3 or less.

Some examples include; ethylene glycol monopropyl ether, ethylene glycol monobutyl ether, ethylene glycol monohexyl ether, ethylene glycol mono-2-ethylhexyl ether, diethylene glycol monomethyl ether, diethylene glycol monoethyl ether, diethylene glycol monopropyl ether, diethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol mono-n-propyl ether, dipropylene glycol mono-n-butyl ether.

In some embodiments, the glycol ether is selected from a combination of two or more glycol ethers.

In some embodiments, at least one of the Compatibility Enhancers is an ester. Ester Compatibility Enhancers include $C_2$-$C_{30}$ esters. The carbon atoms on either side of the ester linkage can be linear, branched, saturated, unsaturated, or cyclic, or aromatic or poly aromatic.

Some examples of ester Compatibility Enhancers include methyl acetate, ethyl acetate, n-propyl acetate, isopropyl acetate, n-butyl acetate, isobutyl acetate, tert-butyl acetate, amyl acetate, methyl amyl acetate, n-propyl propionate, n-butyl propionate, isobutyl isobutyrate, 2-ethylhexyl acetate, ethylene glycol diacetate, dimethyl adipate, dimethyl succinate, dimethyl glutarate, $C_8$-$C_{30}$ fatty acid methyl esters, propylene glycol diacetate (diacetoxypropane), and combinations of two or more thereof. In some embodiments, the longest hydrocarbon chain in the ester Compatibility Enhancer contains $C_1$-$C_8$ atoms.

In some embodiments, at least one of the Compatibility Enhancers is a glycol ether ester. Glycol ether esters have structures similar to glycol ethers except that they possess an ester linkage in the place of the hydroxy group on the corresponding glycol ether.

The glycol ether and polyglycol ether are as described previously. The ester portion on the molecule is formed by reacting the terminal hydroxyl group of the glycol with an acyl bearing moiety. The acyl bearing moiety can contain between about 3-30 carbon atoms, wherein the hydrocarbon portion can be linear, branched, saturated, unsaturated, or cyclic or aromatic or poly aromatic.

The esters may also be prepared by esterifying polyethoxylated fatty acids, or esterifying polyglycols to form diesters of polyethers, or esterifying polyethoxylated alcohols to form ether esters Examples of suitable glycols are polyethylene glycols (PEG) and polypropylene glycols (PPG) having a molecular weight of from 100 to 5,000, preferably from 200 to 2,000.

Diesters, or ether/esters and mixtures thereof are suitable as additives. It is preferred that a major amount of the dialkyl compound be present. In particular, $C_6$ to $C_{30}$ ether esters and diesters of polyethylene glycol, polypropylene glycol or polyethylene/polypropylene glycol mixtures are preferred.

Some examples of ether esters include ethyl-3-ethoxypropionate, ethylene glycol monobutyl ether acetate, ethylene glycol monoethyl ether acetate, propylene glycol monoethyl ether acetate, propylene glycol monomethyl ether acetate, diethylene glycol monoethyl ether acetate, diethylene glycol monobutyl ether acetate, dipropylene glycol monomethyl ether acetate, In some embodiments, at least one of the Compatibility Enhancers is an ether compound. Some examples of Compatibility Enhancers selected from the class of ethers include diisopropyl ether, tetrahydrofuran (THF), dipropylene glycol dimethyl ether, and combinations of two or more thereof. In some embodiments, the ether is THF.

In some embodiments, at least one of the Compatibility Enhancers is a ketone. Some examples of Compatibility Enhancers selected from the class of ketones include straight or branched $C_3$ to $C_{30}$ ketones (wherein $C_3$ to $C_{30}$ refers to the number of carbon atoms in the ketone molecule).

Some examples of ketone Compatibility Enhancers are acetone, methyl ethyl ketone, methyl propyl ketone, methyl isobutyl ketone, methyl isoamyl ketone, cyclohexanone, methyl amyl ketone, and combinations of two or more thereof.

In some embodiments, at least one of the Compatibility Enhancers is an amide compound. In some embodiments, the amide is a $C_3$ to $C_{30}$ amide (wherein $C_3$ to $C_{30}$ refers to the number of carbon atoms in the amide molecule). Some examples of Compatibility Enhancers selected from the class of amides include N,N-dimethylformamide (DMF), N-methylpyrrolidone and dimethylacetamide and combinations of two or more thereof. In some embodiments, the amide is DMF.

In some embodiments, at least one of the Compatibility Enhancers is a nitro compound. The nitro compounds can be nitration products of aliphatic or aromatic organic feedstocks, and derivatives there of. These derivatives can contain other aliphatic substituents on the aromatic ring, or can also contain other functional groups such as esters, ethers, amines alcohols, halogens, and combinations there of. Some examples of Compatibility Enhancers selected from the class of nitro compounds include but are not limited to nitropropane isomers, nitrobenzenes, nitro phenols and combinations there of.

In some embodiments the Compatibility Enhancer is selected from an individual compatibility enhancer (glycol ethers, alcohols, ethers, ketones, amides and esters) and in other embodiments the compatibility enhancer is selected from a combination of compatibility enhancers. The preferred individual compatibility enhancers are glycol ethers, alcohols, ethers, and esters, and most preferably glycol ethers, and alcohols.

In some embodiments, the single Compatibility Enhancer is selected from ethylene glycol monopropyl ether, diethylene glycol monobutyl ether, or 2-ethylhexanol.

In some embodiments, the Compatibility Enhancer includes a combination of two or more of the classes of Compatibility Enhancer selected from the group comprising glycol ethers, alcohols, ethers, ketones, amides and esters, wherein any useful combination can be selected. The combination and ratio of Compatibility Enhancers is to be utilized is greatly dependant on the particular properties of the fuel to be stabilized.

In some embodiments the preferred combination of Compatibility Enhancers include at least one glycol ether and at least one alcohol in a ratio range of about 1 part glycol ether to about 3 parts alcohol to a ratio range of about 3 part glycol ether to about 1 parts alcohol, more preferably where the glycol ether and the alcohol are in a ratio of about 1 part glycol ether to about 1 part alcohol of the total of all Compatibility Enhancer components.

In some embodiments the preferred combination of Compatibility Enhancers include at least one poly glycol ether and at least one alcohol in a ratio range of about 1 part poly glycol ether to about 3 parts alcohol to a ratio range of about 3 parts poly glycol ether to about 1 part alcohol, more preferably where the poly glycol ether and the alcohol are in a ratio of about 1 part poly glycol ether to about 1 part alcohol of the total of all Compatibility Enhancer components.

In some embodiments the preferred combination of Compatibility Enhancers include at least one glycol ether, and at least one ester in a ratio range of about 1 part glycol ether to about 3 parts ester to a ratio range of about 3 parts glycol ether to about 1 part ester, more preferably where the glycol ether and the ester are in a ratio of about 1 part glycol ether to about 1 part ester of the total of all Compatibility Enhancer components.

In some such embodiments, the ester is selected from the group consisting of: methyl acetate, ethyl acetate, n-propyl acetate, isopropyl acetate, n-butyl acetate, isobutyl acetate, tert-butyl acetate, propylene glycol diacetate and combinations of two or more thereof.

In some such embodiments the glycol ether Compatibility Enhancer is selected from the group consisting of: ethylene glycol monopropyl ether, ethylene glycol monobutyl ether, ethylene glycol mono-2-ethylhexyl ether, diethylene glycol monomethyl ether, diethylene glycol monoethyl ether, diethylene glycol monopropyl ether, diethylene glycol monobutyl ether, propylene glycol monomethyl ether, dipropylene glycol monomethyl ether, dipropylene glycol monoethyl ether, and combinations of two or more thereof. The glycol ether can also be a polyglycol ether.

In some such embodiments the polyol Compatibility Enhancer is selected from the group consisting of: ethylene glycol, polyethylene glycol, propylene glycol, diethylene glycol, dipropylene glycol and combinations of two or more thereof.

The Compatibility Enhancer are utilized in the formulation in the range of about 10% to about 80%, more preferably between about 10.0% to about 70.0% v/v, even more preferably between about 10.0% to about 60.0% v/v, and most preferably between about 20.0% to about 60.0% v/v of the additive composition.

Another aspect of this invention is a method of diminishing the formation of insoluble particulates in renewable fuels, or blends of renewable fuel with petroleum fuels by metering into the renewable fuel, or the renewable fuel/petroleum fuel blend the particulate inhibition formulation.

The specific level of utilization of the particulate inhibitor formulation is chosen as the amount which is required to produce a worthwhile benefit in retarding particulate formation in either the renewable fuel, or in the renewable fuel petroleum fuel blend. This amount may differ for different fuels and is readily determined by routine experimentation.

The particulate inhibitor formulation is generally present in the renewable component (B100) in the range of about 200 mg/l to about 8000 mg/l; or in the renewable fuel petroleum fuel blend in the range of about 200 mg/l to about 8000 mg/l based on content of the renewable fuel component.

However as a general guide the particulate inhibitor formulation can be suitably added at a treat rate of at least 200 mg/l to about 8000 mg/l, more preferably from 500 mg/l to about 6000 mg/l, and most preferably from about 1000 mg/l to about 4000 mg/l based on renewable fuel content.

It is additionally considered as part of the present invention the utilization of other additives in combination with the renewable fuel and particulate inhibitor formulation, or in combination of renewable fuel petroleum/fuel blend and particulate inhibition formulation, wherein these other additives are present in such amounts so as to provide their normal intended functions.

A non-exclusive list of additives typically used in petroleum fuel and which can be incorporated into petroleum fuel renewable fuel blends are: (a) low temperature operability/cold flow additives such as ethylene-unsaturated ester copolymers, comb polymers containing hydrocarbyl groups pendant from a polymer backbone, polar nitrogen compounds having a cyclic ring system, hydrocarbyl, hydrocarbon polymers such as ethylene alpha-olefin copolymers, polyoxyethylene esters, ethers and ester/ether mixtures such as behenic diesters of polyethylene glycol, (b) corrosion inhibitors, such as fatty amines, poly amines and amides thereof known as filming amines, and polymers of fatty acids known as dimer trimer acids, (c) cetane improvers such as 2-ethyl hexyl nitrite (2EHN) and di-tert butyl peroxide (DTBP), (d) detergents such as components derived from reactions of organic acids with polyamines such as ethylenediamine, diethylenetriamine, triethylenetetramine and tetraethylene pentamine, (e) lubricity improvers, such as components derived from chemical families that include: long chain fatty acids, derivatives of such fatty acids to include salts (both mineral and organic), amides and esters, dimers/trimers of fatty acids, and poly and alkyl amines (which are generally known as "filming amines") and their derivatives such as amides, salts, and oxyalkylates, (i) dyes and markers, (g) anti-icing additives such as ethylene glycol monomethyl ether or diethylene glycol monomethyl ether (h) demulsifiers/anti-haze additives such as those produced from a phenol and an aldehyde under acidic or basic polymerization conditions (industrially known as resoles or novelacs) and their alkoxylated (ethylene, propylene or butylene oxide) products, (i) antioxidant compounds such as hindered phenols exemplified by 2,6-di-t-butyl-4-methylphenol (BHT, butylated hydroxy toluene), 2-t-butyl-4-heptylphenol, 2-t-butyl-4-octylphenol, 2-t-butyl-4-octylphenol, 2-t-butyl-4-dodecylphenol, 2,6-di-t-butyl-4-heptylphenol, 2,6-di-t-butyl-4-dodecylphenol, 2-methyl-6-di-t-butyl-4-heptylphenol, and 2-methyl-6-di-t-butyl-4-dodecylphenol, ortho coupled phenols to include 2,2'-bis(6-t-butyl-4-heptylphenol), 2,2'-bis (6-t-butyl-4-octylphenol), and 2,2'-bis(6-t-butyl-4-dodecylphenol), where BHT is suitable, as are 2,6- and 2,4-di-t-butylphenol and 2,4,5- and 2,4,6-triisopropylphenol, and anti oxidants based on aromatic amines such as phenelene diamines (j) metal deactivators such as (l) benzotriazoles and derivatives thereof, for example, 4- or 5-alkylbenzotriazoles (e.g. tolutriazole) and derivatives thereof, 4,5,6,7-tetrahydrobenzotriazole and 5,5'-methylenebisbenzotriazole, Mannich bases of benzotriazole or tolutriazole, e.g. 1-[bis(2-ethylhexyl)aminomethyl]tolutriazole, 1-[bis(2-ethylhexyl)aminomethyl]benzotriazole, and alkoxyalkylbenzotriazoles such as 1-(nonyloxymethyl)-benzotriazole, 1-(1-butoxyethyl)benzotriazole and 1-(1-cyclohexyloxybutyl)-tolutriazole, (2) 1,2,4-triazoles and derivatives thereof, for example, 3-alkyl(or aryl)-1,2,4-triazoles, and Mannich bases of 1,2,4-triazoles, such as 1-[bis(2-ethylhexyl)aminomethyl-1,2,4-triazole; alkoxyalkyl-1,2,4-triazoles such as 1-(1-butoxytheyl)-1,2,4-trizole, and acylated 3-amino-1,2,4-triazoles, (3) Imidazole derivatives, for example 4,4'-methylenebis(2-undecyl-5-methylimidazole) and bis[(N-methyl)imidazol-2-yl]carbinol octyl ether (4) Sulfur-containing heterocyclic compounds, e.g. 2-mercaptobenzothiazole, 2,5-dimercapto-1,3,4-thiadiazole and derivatives thereof, and 3,5-bis[di(2-ethyl-hexyl)aminomethyl]-1,3,4-thiadiazolin-2-one, and (5) Amino compounds and imino compounds, such as N,N'-disalicylidene propylene diamine (DMD), salicylaminoguanadine and salts thereof, (k) biocides, (l) thermal stabilizers such as those compounds containing secondary and tertiary amines, (m) anti-foams such as poly ether modified siloxanes and (n) conductivity additives such as those having components derived from chemical families that include: aliphatic amines-fluorinated polyolefins (U.S. Pat. No. 3,652,238, the entire teaching of which is incorporated herein), chromium salts and amine phosphates (U.S. Pat. No. 3,758,283, the entire teaching of which is incorporated herein), alpha-olefin-sulfone copolymer class—polysulphone and quaternary ammonium salt (U.S. Pat. No. 3,811,848, the entire teaching of which is incorporated herein), polysulphone and quaternary ammonium salt amine/epichlorhydrin adduct dinonylnaphthylsulphonic acid (U.S. Pat. No. 3,917,466, the entire teaching of which is incorporated herein), copolymer of an alkyl vinyl monomer and a cationic vinyl monomer (U.S. Pat. No. 5,672,183, the entire teaching of which is incorporated herein), alpha-olefin-maleic anhydride copolymer class (U.S. Pat. Nos. 3,677,725 & 4,416,668, the entire teachings of which are incorporated herein), methyl vinyl ether-maleic anhydride copolymers and amines (U.S. Pat. No. 3,578,421, the entire teaching of which is incorporated herein), alpha-olefin-acrylonitrile (U.S. Pat. Nos. 4,333,741 & 4,388,452, the entire teachings of which are incorporated herein), alpha-olefin-acrylonitrile copolymers and polymeric polyamines (U.S. Pat. No. 4,259,087, the entire teaching of which is incorporated herein), and copolymer of an alkylvinyl monomer and a cationic vinyl monomer and polysulfone (U.S. Pat. No. 6,391,070, the entire teaching of which is incorporated herein), an ethoxylated quat (U.S. Pat. No. 5,863,466, the entire teaching of which is incorporated herein), hydrocarbyl monoamine or hydrocarbyl-substituted polyalkyleneamine (U.S. Pat. No. 6,793,695, the entire teaching of which is incorporated herein), acrylic-type ester-acrylonitrile copolymers and polymeric polyamines (U.S. Pat. Nos. 4,537,601 & 4,491,651, the entire teachings of which are incorporated herein), diamine succinamide reacted with an adduct of a ketone and $SO_2$ (β-sultone chemistry) (U.S. Pat. No. 4,252,542, the entire teaching of which is incorporated herein).

Low temperature operability/cold flow additives are used in fuels to enable users and operators to handle the fuel at temperatures below which the fuel would normally cause operational problems. Distillate fuels such as diesel fuels tend to exhibit reduced flow at low temperatures due in part to formation of waxy solids in the fuel. The reduced flow of the distillate fuel affects transport and use of the distillate fuels in refinery operations and internal combustion engines. This is a particular problem during the winter months and especially in northern regions where the distillates are frequently exposed to temperatures at which solid formation begins to occur in the fuel, generally known as the cloud point (ASTM D 2500) or wax appearance point (ASTM D 3117). The formation of waxy solids in the fuel will in time essentially prevent the ability of the fuel to flow, thus plugging transport lines such as refinery piping and engine fuel supply lines. Under low temperature conditions during consumption of the distillate fuel, as in a diesel engine, wax precipitation and gelation can cause the engine fuel filters to plug resulting in engine inoperability. An example of a low temperature operability/cold flow additive available from Innospec Inc. of Newark, Del. is PPD 8500.

Corrosion Inhibitors are a group of additives which are utilized to prevent or retard the detrimental interaction of fuel and materials present in the fuel with engine components. The additives used to impart corrosion inhibition to fuels generally also function as lubricity improvers. Examples of corrosion inhibitors available from Innospec Inc. of Newark, Del. are DCI 6A, and DCI 4A.

Cetane Improvers are used to improve the combustion properties of middle distillates. Fuel ignition in diesel engines is achieved through the heat generated by air compression, as a piston in the cylinder moves to reduce the cylinder volume during the compression stroke. In the engine, the air is first compressed, then the fuel is injected into the cylinder; as the fuel contacts the heated air, it vaporizes and finally begins to burn as the self-ignition temperature is reached. Additional fuel is injected during the compression stroke and the fuel burns almost instantaneously, once the initial flame has been established. Thus, a period of time elapses between the beginning of fuel injection and the appearance of a flame in the cylinder. This period is commonly called "ignition delay" and must be relatively short in order to avoid "diesel knock". A major contributing factor to diesel fuel performance and the avoidance of "diesel knock" is the cetane number of the diesel fuel. Diesel fuels of higher cetane number exhibit a shorter ignition delay than do diesel fuels of a lower cetane number. Therefore, higher cetane number diesel fuels are desirable to avoid diesel knock. Most diesel fuels possess cetane numbers in the range of about 40 to 55. A correlation between ignition delay and cetane number has been reported in "How Do Diesel Fuel Ignition Improvers Work" Clothier, et al., Chem. Soc. Rev, 1993, pg. 101-108, the entire teaching of which is incorporated herein. Cetane improvers have been used for many years to improve the ignition quality of diesel fuels. This use is described in U.S. Pat. No. 5,482,518 (the entire teaching of which is incorporated herein by reference). An example of a Cetane Improver available from Innospec Inc. of Newark Del. is CI-0801.

Detergents are additives which can be added to hydrocarbon fuels to prevent or reduce deposit formation, or to remove or modify formed deposits. It is commonly known that certain fuels have a propensity to form deposits which may cause fuel injectors to clog and affect fuel injector spray patterns. The alteration of fuel spray patterns may cause non uniform distribution and/or incomplete atomization of fuel resulting in poor fuel combustion. The accumulation of deposits is characterized by overall poor drivability including hard starting, stalls, rough engine idle and stumbles during acceleration. Furthermore if deposit build up is allowed to proceed unchecked, irreparable harm may result which may require replacement or non-routine maintenance. In extreme cases, irregular combustion could cause hot spots on the pistons which can resulted in total engine failure requiring a complete engine overhaul or replacement. Examples of detergents available from Innospec Inc. of Newark, Del. are DDA 350, and OMA 580.

Lubricity improvers increase the lubricity of the fuel, to prevent wear on contacting metal surfaces in the engine. Certain diesel engine designs rely on fuel as a lubricant for their internal moving components. A potential detrimental result of poor lubricating ability of the fuel can be premature failure of engine components (e.g. fuel injection pumps). Examples of lubricity improvers available from Innospec Inc. of Newark, Del. are OLI 9070.x and OLI9101.x.

Dyes and Markers are materials used by the EPA (Environmental Protection Agency) and the IRS (Internal Revenue Service) to monitor and track fuels. Since 1994 the principle use for dyes in fuel is attributed to the federally mandated dying or marking of untaxed "off-road" middle distillate fuels as defined in the Code of Federal Regulations, Title 26, Part 48.4082-1 (26 CFR 48.4082-1). Dyes are also used in Aviation Gasoline; Red, Blue and Yellow dyes denote octane grades in Avgas. Markers are used to identify, trace or mark petroleum products without imparting visible color to the treated product. One of the main applications for markers in fuels is in Home Heating Oil. Examples of Dyes and Markers available from Innospec Inc. of Newark, Del. are Oil Red B4 and Oil Color IAR.

Anti-Icing Additives are mainly used in the aviation industry and in cold climates. They work by combining with any free water and lowering the freeze point of the mixture that no ice crystals are formed. Examples of anti-icing additives available from Innospec Inc. of Newark, Del. are Dri-Tech and DEGME.

Demulsifiers/Anti-Haze additives are mainly added to the fuel to combat cloudiness problems which may be caused by the distribution of water in a wet fuel by a dispersant used in stability packages. Examples of demulsifiers/anti-haze additives available from Innospec Inc. of Newark, Del. are DDH 10 and DDH 20.

Antioxidants are used to inhibit the degradation of fuels by interaction of the fuel with atmospheric oxygen. This process is known as "Oxidative Instability". The oxidation of the fuel results in the formation of alcohols, aldehydes, ketones, carboxylic acids and further reaction products of these functional groups, some of which may yield polymers. Antioxidants function mainly by interrupting free radical chain reactions thus inhibiting peroxide formation and fuel degradation. Examples of antioxidants additives available from Innospec Inc. of Newark, Del. are AO 37 and AO 29.

Metal Deactivators are chelating agents that form stable complexes with specific metals. Certain metals (e.g. copper and zinc) are very detrimental to fuel stability as they catalyze oxidation processes resulting in fuel degradation (increase in gums, polymers, color, and acidity). An example of a metal deactivator available from Innospec Inc. of Newark, Del. is DMD.

Biocides are used to control microorganisms such as bacteria and fungi (yeasts, molds) which can contaminate fuels. Biological problems are generally a function of fuel system cleanliness, specifically water removal from tanks and low point in the system. An example of a Biocide available from Innospec Inc. of Newark, Del. is 6500.

Thermal Stabilizers are additives which help prevent the degradation of fuel upon exposure to elevated temperatures. Fuel during its use cycle is exposed to varying thermal stresses. These stresses are: 1) In storage—where temperatures are low to moderate, 0 to 49° C. (32 to 120° F.), for long periods of time, 2) In vehicle fuel systems—where temperatures are higher depending on ambient temperature and engine system, 60 to 70° C. (140 to 175° F.), but the fuel is subjected to these higher temperatures for shorter periods of time than in normal storage, and 3) In (or near) the engine—where temperatures reach temperatures as high as 150° C. (302° F.) before injection or recycling, but for even shorter periods of time. Thermal stability additives protect the fuel uniformity/stability against these types of exposures. Examples of thermal stabilizers available from Innospec Inc. of Newark, Del. are FOA 3 and FOA 6.

Anti-foams additives are mainly utilized to prevent foaming of the fuel during pumping, transport and use. Examples of anti-foams available in the marketed are the TEGO-PREN™ (available from Dow Corning), SAG™ (available from ex OSi—now Dow), and RHODORSIL™ (available from ex Rhone Poulenc).

Conductivity Additives/Static Dissipaters/Electrical Conductivity additives are used to minimize the risk of electrostatic ignition in hydrocarbons fuels and solvents. It is widely known that electrostatic charges can be frictionally transferred between two dissimilar, nonconductive materials. When this occurs, the electrostatic charge thus created appears at the surfaces of the contacting materials. The magnitude of the generated charge is dependent upon the nature of and, more particularly, the respective conductivity of each material. Electrostatic charging is known to occur when solvents and fuels flow through conduits with high surface area or through "fine" filters. The potential for electrostatic ignition and explosion is probably at its greatest during product handling, transfer and transportation. Thus, the situations which are of greatest interest to the petroleum industry are conditions where charge is built up in or around flammable liquids, and the possibility of discharge leading to incendiary sparking, and perhaps to a serious fire or explosion. Countermeasures designed to prevent accumulation of electrostatic charges on a container being filled such as container grounding (i.e. "earthing") and bonding are routinely employed. However, it has been recognized that grounding and bonding alone are insufficient to prevent electrostatic build-up in low conductivity, volatile organic liquids. Organic liquids such as distillate fuels like diesel, gasoline, jet fuel, turbine fuels and kerosene, and relatively contaminant free light hydrocarbon oils such as organic solvents and cleaning fluids are inherently poor conductors. Static charge accumulates in these fluids because electric charge moves very slowly through these liquids and can take a considerable time to reach a surface which is grounded. Until the charge is dissipated, a high surface-voltage potential can be achieved which can create an incendiary spark, resulting in an ignition or an explosion. The increased hazard presented by low conductivity organic liquids can be addressed by the use of additives to increase the conductivity of the respective fluids. The increased conductivity of the liquid will substantially reduce the time necessary for any charges that exist in the liquid to be conducted away by the grounded inside surface of the container. Examples of conductivity additives available from Innospec Inc. of Newark, Del. are Stadis® 425 and Stadis® 450.

The general chemistries and compositions of these additive families which function to impart or enhance the desired fuel characteristics are fully known in the art. A person having ordinary skill in the art to which this invention pertains can readily select an additive to achieve the enhancement of the desired fuel property.

The invention is further described by the following illustrative but non-limiting examples. The following examples depict affect of the novel additive composition on particulate inhibition in renewable fuels and renewable fuel petroleum fuel blends.

EXAMPLES

Certain substances that are soluble or appear to be soluble in renewable fuel or in renewable fuel petroleum blends at ambient temperatures can upon cooling or standing for extended periods, come out of solution and possibly block fuel delivery systems.

Two testing methods were used to assess the propensity of a fuel to form in-soluble substances during extended storage.

Particulate Inhibition Testing Method—Filtration Test (ASTM):

This test method covers the determination by filtration time after cold soak the suitability of a Biodiesel (B100) for blending with light-middle and middle distillates to provide adequate low temperature operability performance to at least the cloud point of the finished blend. The test method can be used as a means of evaluating the propensity of a biodiesel and biodiesel blends to cause fuel filter plugging. Fuels that give short filtration times are expected to give satisfactory operation down to the cloud point of biodiesel blends.

Testing Procedure: Place 300 mL of sample in a glass 500 mL bottle and set in a liquid or air bath or chamber at 4.4° C.+/−1.1° C. (40° F.±2° F.) for 16±0.5 hours. After the 16 hour cold soak is completed, allow the sample to come back to room temperature (20-22° C./68-720° F.) on its own without external heating. The sample shall be completely liquid before filtration. The sample should be filtered within 1 hour after reaching 20-22° C. (68-72° F.). Complete assembly of the receiving flask, 0.7 micron glass fiber filter and funnel as a unit (see FIG. 1) before swirling the sample. To minimize operator exposure to fumes, the filtering procedure should be performed in a fume hood. Start the vacuum system. Record the vacuum in kPa (inches of Hg) after one minute of filtration. The vacuum shall be between 71.1 and 84.7 kPa (21 and 25 inches of Hg). If the vacuum is not within the specified range, make adjustments to the vacuum system. Thoroughly clean the outside of the sample container in the region of the cap by wiping it with a damp, lint-free cloth. Swirl the container vigorously for about 2-3 seconds to dislodge any particles that may have adhered to the walls of the container. Immediately after swirling, pour the entire contents of the sample container into the filtration funnel and simultaneously start the timer. The entire contents of the sample container shall be filtered through the glass fiber filter to ensure a correct measure of the contamination in the sample. Care must be taken not to shake the sample vigorously as this could cause some of the solids to go back into solution. If the filtration is not complete when 720 seconds (12 minutes) has elapsed, turn off the vacuum system and record the duration of the filtration to the nearest second. Record the vacuum just before the termination of the filtration, and also record the volume which was filtered after 720 seconds.

Bio Diesel (B100) from different feed stocks were evaluated as per the filtration method. Table 1 denotes the filtration times for the base fuels.

TABLE 1

| Fuel | Untreated | | |
|---|---|---|---|
| | Time | mls | Vacuum mmHg |
| Palm | 19 sec | 300 | 15 |
| Tallow | 12 mins | 80 | 15 |
| Coconut | 11 sec | 300 | 19 |
| Soy | 10 sec | 300 | 16 |
| Soy | 14 sec | 300 | 14 |

The respective B100's were treated with 2000 mg/l of a particulate inhibitor formulation. The treated samples were evaluated as per ASTM filtration method. Table 2 denotes the filtration times for the treated fuels.

TABLE 2

| Fuel | Particulate Inhibitor Formulation | | |
|---|---|---|---|
| | Time | mls | Vacuum mmHg |
| Palm | 14 sec | 300 | 15* |
| Tallow | 6 min 55 sec | 300 | 14 |
| Coconut | 9 sec | 300 | 15 |
| Soy | 9 sec | 300 | 15 |
| Soy | 14 sec | 300 | 14 |

Data clearly indicates that an additive can enhance bio diesel filterability times. The additive evaluated in the study was a bio diesel particulate inhibiting additive, composed 60% of a acrylic acid polymer and 40% diluents.

Particulate Inhibition Testing Method—Visual Test:

The two soy (B100) biodiesel samples evaluated in the filtration experiment were further stressed to measure the impact of low temperature extended storage on particulate formation. While both the base fuel samples tested had performed very well in the filtration test method, there is industry concern that the filtration method may not be fully adequate to predict particulate formation under field use conditions.

Two sets of Soy samples (containing blanks and additized fuels) were cooled and held at −5 C for 5 days. The temperature of the test was well below the pour point (0 C, 32 F) of either base bio diesels. The fuels were treated with 2000 mg/l of the additive formulation.

The components used in the additive formulation to test the two fuels are listed in table 3A and Table 3 B.

TABLE 3A

| | Agglomeration Retarder | Particulate Dispersant | Particulate Settling Inhibitor | Compatibility Enhancer A | Solvent - Soy Biodiesel |
|---|---|---|---|---|---|
| 1 | 60 | 0 | 0 | 10 | 30 |
| 2 | 40 | 10 | 10 | 10 | 30 |
| 3 | 30 | 20 | 10 | 10 | 30 |
| 4 | 50 | 10 | 0 | 10 | 30 |
| 5 | 40 | 20 | 0 | 10 | 30 |

TABLE 3B

| | Agglomeration Retarder | Particulate Dispersant | Particulate Settling Inhibitor | Compatibility Enhancer B | Solvent - Soy Biodiesel |
|---|---|---|---|---|---|
| 6 | 60 | 0 | 0 | 10 | 30 |
| 7 | 40 | 10 | 10 | 10 | 30 |
| 8 | 30 | 20 | 10 | 10 | 30 |
| 9 | 50 | 10 | 0 | 10 | 30 |
| 10 | 40 | 20 | 0 | 10 | 30 |

The specific formulation components selected for evaluation of formulation component performance were: Agglomeration Retarder—Viscoplex 10390 obtained from Rhomax, Particulate Dispersant—OMA 350 obtained form Innospec Fuel Specialties LLC, Particulate Settling inhibitor Dodiwax 4500 obtained from Clariant, Compatibility Enhancer A—2-ethylhexanol—and Compatibility Enhancer B—Butoxy ethanol The cold stored fuels were evaluated for particulate formation and visibly rated with the best being little or no of visible particulates, to the worst being sample that contains the most visible particulates. It is important to note that while some of the formulations performed better than others, they all performed better than the untreated sample which was completely solid after 2 day of storage. The 5 day storage results are listed in table 4.

TABLE 4

| Inhibition of Particulate Formation | Day 1 | Day 2 | Day 5 |
|---|---|---|---|
| Fuel I | | | |
| Best | 2, 7, 6 | 7, 2 | 2, 7 |
| | 5, 4, 1 | 5, 6, 4, 1 | 5, 6, 4, 1 |
| | 9, 10 | 9, 10 | 9, 10 |
| | 8, 3 | 8, 3 | 8, 3 |
| Worst | Base Fuel I | Base Fuel I | Base Fuel I |
| Fuel II | | | |
| Best | 3, 6, 5 | 6, 7, 2 | 4, 7 |
| | 4, 7, 9 | 4, 8, 3 | 3, 8, 2 |
| | 8, 10, 2 | 10, 5 | 6, 10, 9 |
| | 1 | 1, 9 | 5, 1 |
| Worst | Base Fuel II | Base Fuel II | Base Fuel II |

The order of performance of the additives in Fuel I (Least to most solids) was 2,7>5,6,4,1>9,10>8,3>>base Fuel I; and for Fuel II was 4,7>2,3,8>6,9,10>5,1>>base Fuel II.

The results clearly indicate an enhancement of particulate inhibition in bio diesel, specifically the ability of the additive package to diminish particulate formation and inhibit gelling of the bio fuel.

All of the compositions and methods disclosed and claimed herein can be made and executed without undue experimentation in light of the present disclosure. While the compositions and methods of this invention have been described in terms of preferred embodiments, it will be apparent to those skilled in the art that variations may be applied to the compositions and/or methods and in the steps or in the sequence of steps of the methods described herein without departing from the concept, spirit and scope of the invention. More specifically, it will be apparent that certain agents which are both chemically and physiologically related may be substituted for the agents described herein where the same or similar results would be achieved. All such similar substitutes and modifications apparent to those skilled in the art are deemed to be within the spirit, scope and concept of the invention as defined by the appended claims.

What is claimed is:

1. A method of inhibiting formation of particulates above the cloud point in biodiesel fuels or blends of biodiesel fuels and petroleum fuels comprising:
    providing a biodiesel fuel or blend of biodiesel fuel and petroleum fuel which forms particulates in storage at temperatures above the cloud point, wherein said biodiesel fuel is a product produced from the trans esterification of a naturally occurring oil derived from plants or animals with an alcohol; or is an ester formed by reacting a fatty acid derived from a naturally occurring oil with an alcohol;
    adding a particulate inhibiting additive composition to the fuel or blend wherein the particulate inhibiting additive composition comprises one or more of:
        (a) an Agglomeration Retarder comprising homopolymers or co-polymers of acrylic acid or acrylic acid derivatives; and/or
        (b) a Particulate Dispersant selected from the group consisting of acylated nitrogen compounds; substituted amines; nitrogen-containing condensates of a phenol and an aldehyde;
    and mixtures thereof;
    and storing said additised fuel or blend above the cloud point temperature
    whereby particulates do not form in the additised fuel or blend during storage above the cloud point temperature.

2. The method of claim 1, wherein said Agglomeration Retarder is prepared from monomers selected from the group consisting of monomers represented by general formulas I and II:

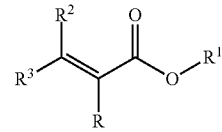

General Formula I wherein:
R=a hydrogen atom, or an optionally substituted hydrocarbon group having from 1 to 30 carbon atoms;
R1=H, or an optionally substituted hydrocarbon group having from 1 to 30 carbon atoms;
R2=a hydrogen atom, or an optionally substituted C1-8 alkyl group; and
R3=a hydrogen atom, or an optionally substituted C1-8 alkyl group; or
R2 and R3 together with the connected carbon atom represent an optionally substituted cycloalkyl or cycloalkylene ring having 5-20 carbon ring atoms;

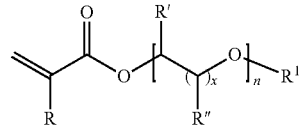

General Formula II wherein:
R=a hydrogen atom, or an optionally substituted hydrocarbon group having from 1 to 30 carbon atoms
R', R''=a hydrogen atom or an optionally substituted, C1-8 alkyl group
R1=H, or an optionally substituted hydrocarbon group having from 1 to 30 carbon atoms
x=between 0-5
n=between 1 and 100.

3. The method of claim 2, wherein the proportions of the monomers selected from the general formula I is 100% of the polymer.

4. The method of claim 2, wherein the proportions of monomers selected from the general formula II is 100% of the polymer.

5. The method of claim 1, wherein said Agglomeration Retarder comprises 60% acrylic acid polymer and 40% diluents.

6. The method of claim 1, wherein said Particulate Dispersant is selected from the group consisting of a hydrocarbyl amine, an aromatic amine, an aromatic polyamine, a polyamine, and a polyamine alkoxylate.

7. The method of claim 1, wherein said Particulate Dispersant is derived from combination of a carboxylic acid acylating agent and an amino compound to form an imido, amido, amidine or acyloxy ammonium compound.

8. The method of claim 1, wherein said Particulate Dispersant is a combination of any two or more of a substituted amine, an acylated nitrogen compound, and nitrogen-containing condensates of a phenol and an aldehyde.

9. The method of claim 1, wherein said Particulate Dispersant is the reaction product of a poly(isobutene)-substituted succinic acid-derived acylating agent, wherein the poly(isobutene)-substituent has between about 12 to about 200 carbon atoms, with a mixture of ethylene polyamines having about 3 to about 9 amino nitrogen atoms per ethylene polyamine and about 1 to about 8 ethylene groups.

10. A method of inhibiting formation of articulates above the cloud point in biodiesel fuels or blends of biodiesel fuels and petroleum fuels comprising:
providing a biodiesel fuel or blend of biodiesel fuel and petroleum fuel which forms particulates in storage at temperatures above the cloud point,
adding a particulate inhibiting additive composition to the fuel or blend wherein the particulate inhibiting additive composition comprises one or more of:
(a) an Agglomeration Retarder comprising homopolymers or co-polymers of acrylic acid or acrylic acid derivatives; and/or
(b) a Particulate Dispersant selected from the group consisting of acylated nitrogen compounds; substituted amines; nitrogen-containing condensates of a phenol and an aldehyde;
and mixtures thereof; wherein said particulate inhibiting additive composition further comprises a Particulate Settling Inhibitor selected from the group consisting of:
(i) hydrocarbon polymers,
(ii) oxyalkylene polymers, and
(iii) nitrogen containing polymers;
and storing said additised fuel or blend above the cloud point temperature
whereby particulates do not form in the additised fuel or blend during storage above the cloud point temperature.

11. The method of claim 10, wherein said hydrocarbon polymers is selected from the group consisting of polymers represented by the general formula:

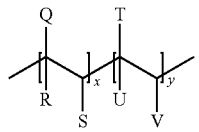

wherein
R=H, hydrocarbyl, or hydrocarbylene with from 1 to 30 carbon atoms, or aryl or Q;
Q=R, COOR, OCOR, COOH, or OR;
S=H or Q;
T=H, R, COOR, or an aryl or heterocyclic group;
U=H, COOR, OCOR, OR, or COOH;
V=H, R, COOR, OCOR, COOH, or COOH; and
x and y represent mole fractions (x/y) of monomers, preferably within the range of from about 2.5 to about 0.4, and
wherein said oxyalkylene polymers is selected from the group consisting of esters, ethers and ester/ether polymers represented by general formulas:

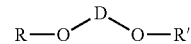

wherein R and R' may be the same or different, and wherein
R, R'=n-alkyl-, n-alkyl-CO—, n-alkyl-O—CO(CH2)x-, or n-alkyl-O—CO(CH2)x-CO—;
D=polyalkylene; and
x is an integer from 1 to 60, and
wherein said Nitrogen containing polymers is selected from the group consisting of amide, imide, imidazoline, carbamate, urea, imine, enamine derivatives of primary amines, enamine derivatives of secondary amines and enamine derivatives of polyamines.

12. The method of claim 11, wherein said polyamines are represented by general formulas:

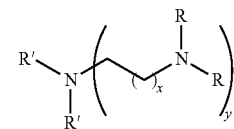

wherein:
R, R' can be a linear alkyl, a branched alkyl containing 1 to 30 carbon atoms, aromatic, cyclic, polycyclic, poly alkoxy, or carbonyl;
R, R' alternatively contain hetero atoms such as O, N, S, and P;
R' and R' alternatively are incorporated in a ring system containing 3-12 members;
x can be 1-6; and
y can be 1-6.

13. The method of claim 1, wherein said particulate inhibiting additive composition further comprises a Compatibility Enhancer selected from the group consisting of: monofunctional alcohols, glycols, polyols, esters, ethers, glycol ether acetates, ketones, glycol ethers, amides, amines, nitro compounds and combinations of two or more thereof.

14. The method of claim 1, further comprising the step of adding to the fuel or blend one or more compositions selected from the group consisting of: (a) low temperature operability/cold flow additives, (b) corrosion inhibitors, (c) cetane improvers, (d) detergents, (e) lubricity improvers, (f) dyes or markers, (g) anti-icing additives, (h) demulsifiers/anti haze additives, (i) antioxidants, (j) metal deactivators, (k) biocides, (l) thermal stabilizers (m) antifoaming agents, (n) static dissipater additives, and combinations thereof.

15. The method of claim 1, wherein said petroleum fuel is selected from the group consisting of a middle distillate fuel, a jet fuel and a Fischer-Tropsch fuel, and wherein said petroleum fuel comprises less than 500 ppm by mass of sulfur.

16. The method of claim 15, wherein said petroleum fuel comprises less than 15 ppm by mass of sulfur.

17. The method of claim 1, wherein said oil is selected from the group consisting of soy, palm, palm kernel, jatropha, rapeseed, linseed, coconut, corn, cotton, cooking, sunflower, safflower, tallow, lard, yellow grease, fish and combinations thereof; and wherein said alcohol is selected from the group consisting of linear, branched, alkyl, aromatic, primary, secondary, tertiary and polyols.

* * * * *